May 20, 1952     S. G. SEIDEL ET AL     2,597,387

DEVICE FOR OPENING AND EMPTYING CARTONS

Filed Feb. 26, 1947     10 Sheets-Sheet 1

May 20, 1952 S. G. SEIDEL ET AL 2,597,387
DEVICE FOR OPENING AND EMPTYING CARTONS
Filed Feb. 26, 1947 10 Sheets-Sheet 2

Inventors:
Stephen G. Seidel
Robert P. Lownes
by their Attorneys
Howson & Howson

May 20, 1952   S. G. SEIDEL ET AL   2,597,387
DEVICE FOR OPENING AND EMPTYING CARTONS
Filed Feb. 26, 1947   10 Sheets-Sheet 3

Inventors:
Stephen G. Seidel
Robert P. Lownes
by their Attorneys
Howson &
Howson

Patented May 20, 1952

2,597,387

UNITED STATES PATENT OFFICE 2,597,387

DEVICE FOR OPENING AND EMPTYING CARTONS

Stephen G. Seidel, Abington, and Robert P. Lownes, Philadelphia, Pa., assignors to John A. Margolis, Philadelphia, Pa.

Application February 26, 1947, Serial No. 731,068

10 Claims. (Cl. 214—1.1)

This invention relates to an apparatus for opening and emptying cartons and is an improvement on the apparatus of Patent No. 2,323,852, granted July 6, 1943, to S. G. Seidel and R. P. Lownes.

An important object of the present invention is the production of an aparatus of the character set forth in said patent in which accurate control of the carton and its contents may be had at all times during the operation of discharging the said contents and in which possibility of breakage of the contents is eliminated or reduced to a minimum.

Another and important object of the invention is the provision of a construction embodying these advances while at the same time materially reducing the all-over size of the machine as described in the foregoing patent and as heretofore employed in the trade.

Still another object of the invention is the provision of an improved means for insuring retention in the carton of the divider, employed in cartons for separating frangible contents such as glassware when the carton and its contents are separated so that the carton may be preserved in its original state and be ready for reception of the removed contents, after the necessary filling or steps have been taken in connection therewith.

A still further object of the invention is the provision of means for timing the presentation of the carton for performance of the various steps necessary to open the carton flaps and removal of the contents thereof.

These and other objects are obtained by the construction shown in the accompanying drawings, wherein, for the purpose of illustration, there is shown a preferred embodiment of the invention, and wherein.

Referring now more particularly to the drawings, the machine illustrated may be considered as divided into three sections—the receiving section 10, the flap-opening section 11, and the carton-removing and contents-dispersing section 12.

The receiving section 10 comprises a pair of conveyor units 13 and 14, each consisting of a series of belts 16 operating about pulleys 17 and adapted to deliver the cartons C from a roller-conveyor 18, or other suitable supply mechanism, to the flap-opening section 11 of the machine. In order that the delivery of the cartons C to the flap-opening mechanism may be regulated and suitably timed with relation to the step-by-step operation of the mechanism included in the flap-opening section (hereinafter to be more fully described), the conveyors 13 and 14 are preferably arranged at different levels as regards their operative flights, the initial or receiving conveyor 13 being arranged at the lower level. At the junction of the conveyor 14 with the conveyor 13, stops 19 are provided against which cartons supported upon the conveyor 13 come to rest, the conveyor moving idly therebeneath. A bell crank 20 actuated from drive motor 21, which motor may also serve as a driving means for conveyors 13 and 14, acts periodically to elevate the forward end of the cartons C resting upon the conveyor 13 which is thereupon delivered by conveyor 13 into engagement with the receiving end of conveyor 14. The bell crank lever is then withdrawn, the carton at this time being disposed above stops 19 and under control of conveyors 13 and 14, which control is maintained until the carton has advanced to a point such that by gravity it comes to rest upon the conveyor 14 and is propelled thereby to the flap-opening mechanism 11. As at present shown, motor 21 drives a worm shaft 22, having a worm 23 driving shaft 24, which is chain and sprocket connected to conveyor 14 as at 25. A driven shaft 26 of conveyor 14 is connected to drive an eccentric 27 through which bell crank 20 is actuated. Shaft 22 (as hereinafter more fully described) controls the sequence of operations of the flap-opening mechanism 11 and of the carton-removing mechanism, so that in all cases delivery of the filled cartons to the flap-opening mechanism and succeeding operations may be synchronized.

The flap-opening mechanism 11 comprises side frames 28 mounting brackets 29, the inner ends of which support guide rails 30 mounting reciprocatory bars 31 having bolted thereto in spaced relation bars 31a to which are pivotally attached pawls 32. Reciprocation of these bars is at present shown as effected by shaft 24, which mounts a crank 39 connected through link 33 to an arm fixed to a shaft 35. Shaft 35 bears spaced arms 36 linked at 37 to their associated reciprocatory bars 31. Brackets 29 also mount longitudinally-extending bars 38, these bars being fixed against longitudinal movement and bearing holding pawls 32a for preventing retrogressive movements of cartons C as these are advanced by bars 31 through the various positions which they occupy in the flap-opening mechanism. The spacing between the bars 31a and bars 31 is made adjustable in order that the machine may be adapted for cartons of different widths. In the case of guide rails 30 these are secured to brackets 29 by bolts 40, which between the guide rails and brackets are surrounded by spacer sleeves 41. Obviously by use of sleeves of different lengths the guide rails 30 may be positioned as desired. Bars 38 are transversely slotted at 42 for the reception of clamping bolts to permit transverse adjustment thereof.

At the receiving end of the flap-opening mechanism there are arranged opposed pairs of rollers 43 supported by brackets 44 slidably seated upon shelves 45 secured to side frames 28. These rollers are adjustable toward and away from one another, brackets 44 being connected by a transverse shaft 46 having opposite threaded engagement therewith. The pairs of rollers 43 are opposedly inclined, sloping inwardly and downwardly with the result that when a carton leaving the conveyor 14 comes to rest thereon (it being assumed that the carton approaches the flap-opening section 11 with the medial line between what may be termed the outer flaps 47 thereof directed longitudinally of the flap-opening section) the weight of the contents, pressing upon the inner flaps 48 and 49 of the carton, will force the outer flaps 47 downwardly so that they rest upon and assume the angles of the associated rollers 43.

Figure 6:
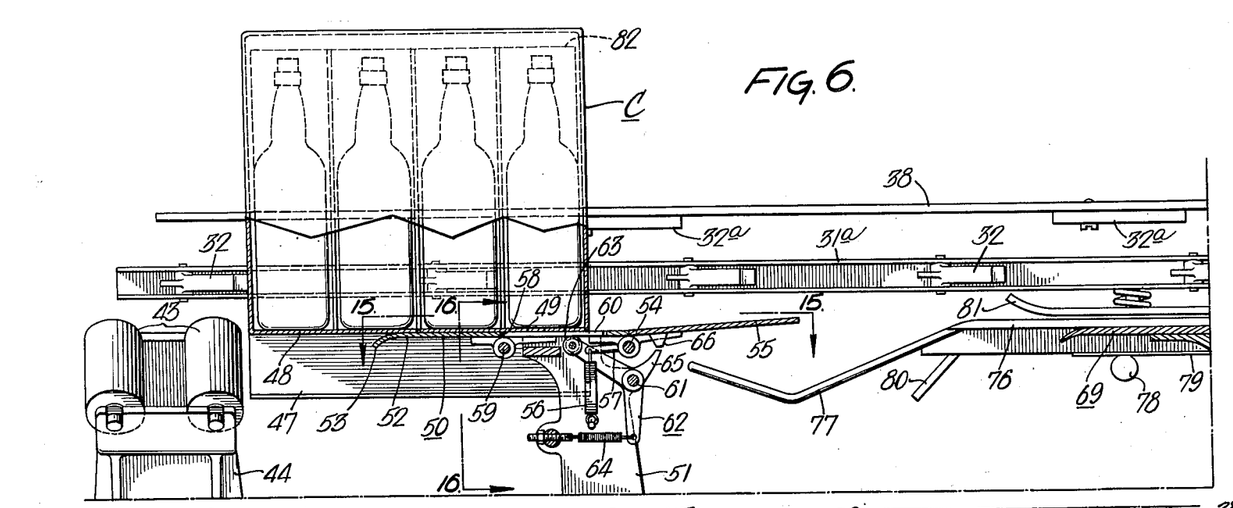
Figure 6 is a fragmentary longitudinal section illustrating the first step in the opening of the carton and removal of the contents thereof.
Figure 8:
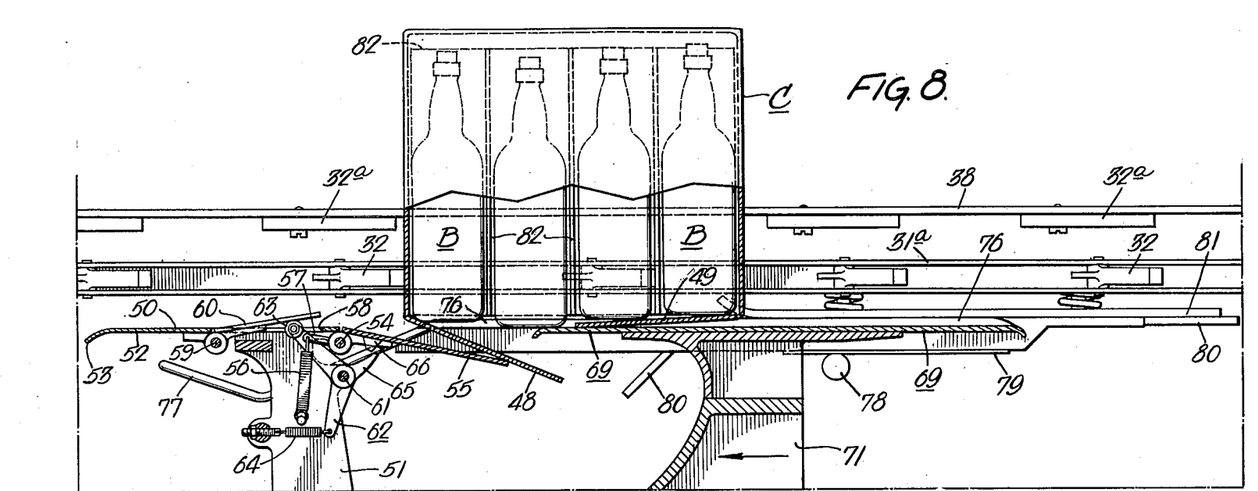
Figures 8, 9, 10, 11, 12, 13 and 14 are longitudinal-sectional views showing succeeding steps in handling the carton and its contents.

From its position on the rollers 43, the movement of the carton through the flap-opening mechanism is under control of reciprocating bars 31a and the pawls thereof, and initial movement of the carton is to the position shown in Figure 6. During this movement carton C is shifted from the rollers 43 to partially overlie a stationary table 50 supported by a fixed bracket 51. Table 50 comprises a fixed leaf 52 adapted to enter between the down-bent outer flaps 47 and engage beneath the inner flaps 48 and 49 to support the same and contents of the carton, the forward edge of this fixed leaf being down-bent as at 53 in order that it may elevate the left-hand inner flaps 49 in event that this is slightly downwardly displaced as may readily be the case. Supporting engagement of both inner flaps by the fixed leaf occurs prior to the time when the outer flaps 47 disengage from rollers 43. The bracket 51 has pivoted thereto at 54 the forward edge of a tiltable leaf 55 for table 50, this leaf being movable between a position where it inclines upwardly and rearwardly as shown in solid lines in Figure 6, and a downwardly and rearwardly inclining position shown in solid lines in Figure 8. A spring 56 connected between bracket 51 and arm 57 secured to leaf 55 normally maintains leaf 55 in its upwardly and rearwardly inclining position shown in Figure 6. The rear edge of fixed leaf 52 is notched at 58, and pivoted to the leaf at the forward end of this notch at 59 is a trip plate 60. Mounted upon a transverse pivot 61 below the table is a control lever 62 having its upper end of roller 63 engaging the under surface of trip plate 60 and having its lower end connected to bracket 51 by a spring 64. This spring serves to normally urge the trip plate 60 to the solid line position of Figure 8, in which position stops 65 carried by control lever 62 are moved out of alignment with abutments 66 on movable leaf 55 and will, thus, permit this movable leaf to shift to its lower solid line position of Figure 8. When, however, trip plate 60 is shifted to a position where it is coplanar with fixed leaf 52, stops 65 and abutments 66 are aligned and movement of the leaf 55 from its upwardly and rearwardly inclining position of Figure 6 toward the position of Figure 8 is limited when the fixed and movable leaves 52 and 55 are in alignment. It will, thus, be seen that when the carton C is being moved from its position of Figure 6 to the position of Figure 7, the table leaves are rigidified to one another and serve as solid support for the inner flaps 48 and 49 of the carton and thus for the contents thereof.

At the rear end of the flap-opening section 11, the side frames 28 are connected by transverse stationary support 67, the forward end of which is inclined downwardly and forwardly as at 68. Arranged between the stationary support 67 and stationary table 50 is a reciprocating table 69 which functions both as a support for the contents of the carton C during its travel along the carton-opening section 11 between the stationary table 50 and support 67, and as a means for opening the inner flaps 48 and 49 of the carton. The table is mounted through a reduced neck 70 upon a slide 71 mounted on longitudinally-extending guide rods 72. Slide 71 is linked at 73 to one arm of bell crank 74, the other arm of which bears a roller engaging the track of a barrel cam 75 driven by the shaft 22, so movements of table 69 may be synchronized with movements of the cartons C as controlled by the reciprocating pawl bars. Cam 75 is so formed that movement of table 69 toward table 50, during which time table 69 is moving in the direction opposed to the direction of movement of carton C, is relatively slow as compared to its return travel or travel toward the support 67. Table 69 includes side bars 76 the upper surfaces of which extend slightly above the surface of table 69 and the ends of which project beyond the ends of this table. At their forward ends, bars 76 are equipped with horns 77 shaped to engage the inner faces of outer flaps 47 of carton C as the table 69 approaches table 50 and spread these flaps outwardly to a horizontal position, so that they and the side edges of the carton may come to rest upon the elevated side bars 76, thus transferring the principal support of the carton to these side bars.

Figure 7:
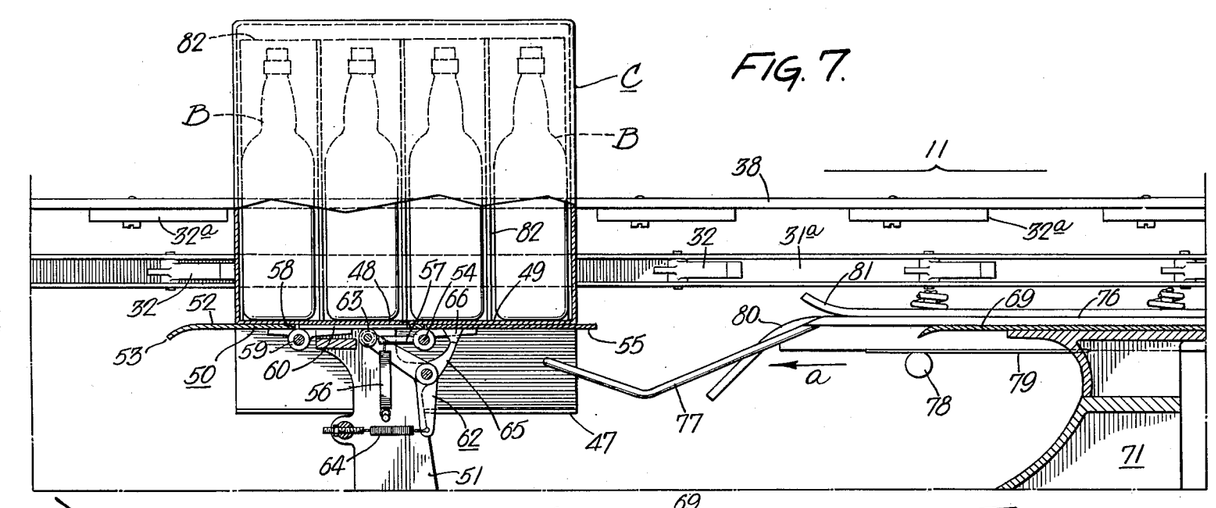
Figure 7 is a longitudinal-sectional view showing the second step in the operation.
Figure 9:
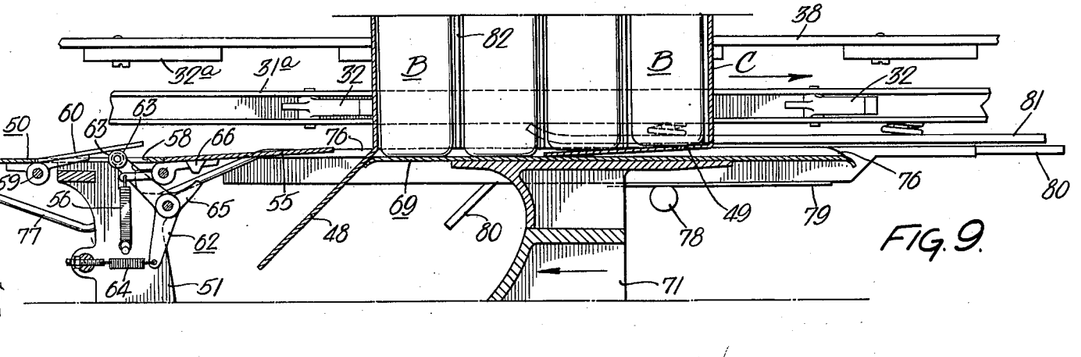

Assuming the parts to be in the position illustrated in Figure 7, the table 69 is moving slowly to the left in the direction of arrow a of this figure and coincidentally with this movement the reciprocatory bars advance the carton C from the position of Figure 7 to the position of Figure 8. In this position forward movement of table 69 has terminated, side bars 76 support the carton, and the table underlies the right-hand inner flap of the carton and projects slightly beyond the meeting line between flaps 48 and 49 so that it serves to support the contents of the carton lying beyond the center thereof and immediately adjacent thereto. The movement of the carton C over table 50 has shifted the left-hand edge of the carton from trip plate 60 and spring 64 has moved the lower end of control lever 62 to the left disengaging stops 65 from abutments 66 and permitting the movable leaf 55 of table 50 to shift downwardly against the action of its spring, thereby permitting the left-hand inner flap of carton C to swing downwardly. The sagging of flap 48 occurs prior to arrival of the carton at the position of Figure 8 with the result that the forward edge of table 69 enters between this flap and the contents of the carton. The next actuation of the reciprocatory bars moves the carton C to the position shown in Figure 10, table 69 during this transition remaining stationary. It will be noted that this movement shifts the carton over movable table 69 from a position where the carton is supported with its left-hand side projecting beyond the left-hand side of the table to a position where the carton has its right-hand side projecting beyond the right-hand side of the table. During this movement the left-hand edge of movable table 69 engages the left-hand flap, and as shown in the intermediate position illustrated in Figure 9 begins deflection of this flap to an outwardly and horizontally disposed position which is completed as the carton arrives at the position of Figure 10, the table 69 now directly supporting that portion of the contents of carton C which are uncovered by the opening of this flap.

Figures 10, 19:
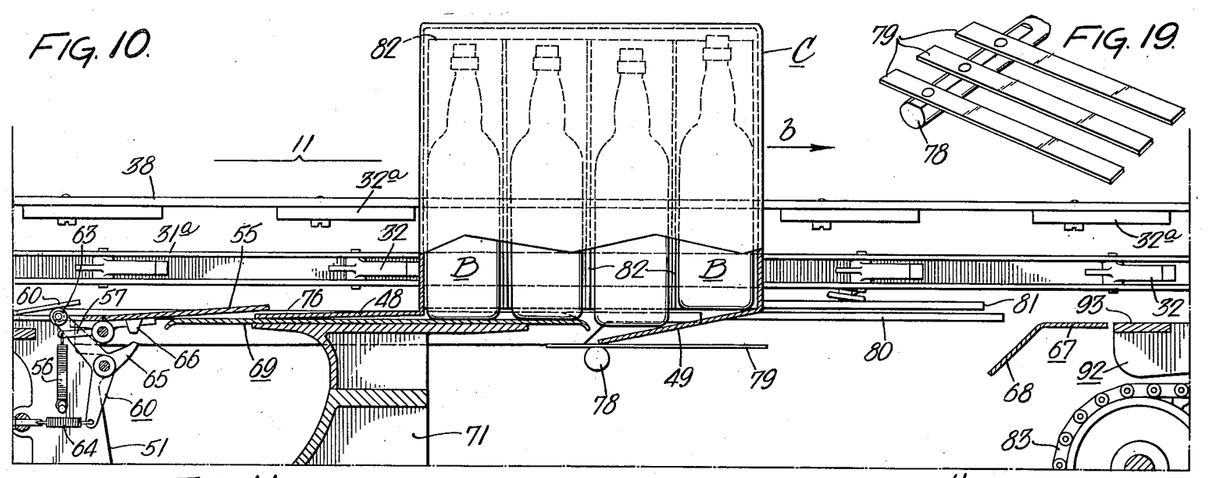
Figure 19 is a fragmentary perspective view of a detail of the apparatus.
Figure 11:
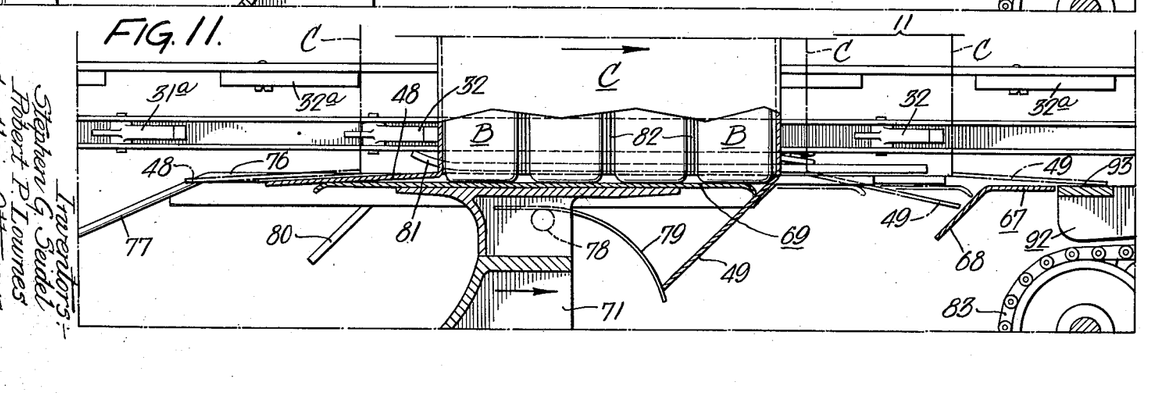

At position of Figure 10, the right-hand inner flap 49 has passed beyond the right-hand end of table 69 and is accordingly subject to opening by the weight of its contents. Projecting inwardly from the side frames 28 is a pair of supports 78 bearing flexible fingers 79 projecting toward the rear end of the machine. The flap 49 when first released from the right-hand edge of table 69, comes to rest upon these supports and may only open through a short distance just sufficient to admit the adjacent edge of the table 69. Table 69 now begins its travel to the right as indicated by the arrow b, Figure 10, and the carton C is simultaneously shifted to the right by the reciprocatory bars 31a. During this combined movement the table 69 is moving more rapidly than the carton and the right-hand edge of the table enters between the flap 49 and contents of the carton, forcing flap downwardly through deflection of the flexible elements 79 as shown in Figure 11, so that the table 69 at an intermediate point illustrated in Figure 11 now fully supports the contents of the carton C and is by continued movement shifting the flap 49 rearwardly and upwardly to a horizontal position. At its rear-most position, table 69 closely approximates stationary support 67 overlying the incline of forward edge 69 thereof, with the result that flap 49 is caused to travel upwardly over the support 67 and come to rest thereon.

As hereinbefore noted, the movable table during that period in which flap 49 is being opened, supports either a portion of or all of the contents of carton C, by direct contact therewith. In order that the friction of the contents upon table 69 may not cause movement of the carton independently of its movement by the rack bars, retarding friction is applied to the carton during this period. As at present shown the outwardly-extending side flaps 47 are moved between horizontal supports 80 and spring-pressed brake elements 81, thus preventing any independent movement of the carton which might result in imperfect opening of flap 49.

The carton-removing and contents-dispensing section 12 comprises a plurality of conveyors, three, indicated at 83, 84 and 85, being shown in the present instance. Of these, the conveyor 83 is aligned with and forms a continuation of the flap-opening section and is of substantially the same width thereas and moves in the same direction as the cartons move over the flap-opening section. The conveyor 84 is relatively narrow and travels in a direction opposite to that of conveyor 83 and at a higher speed. Conveyor 85 in turn operates at a still higher speed and in a direction opposite to that of conveyor 84. Deflector 86 is arranged over the conveyor 83 at its discharge end and deflects the bottles B moving on the conveyor transversely onto the conveyor 84. At the discharge end of conveyor 84 is a second deflector 86a, which shifts the bottles to the conveyor 85 by which they are delivered to the filling and labeling mechanism with which a machine of this character is associated.

Cartons of the type under discussion are primarily intended for the reception of bottles or jars B, these being prevented from jostling contact within the carton, by means of dividers 82 consisting of crossed and inter-engaged cardboard strips. In removing the open carton from the bottles, it is, of course, desirable that the divider be retained with the carton.

At the forward end of conveyor 83 a vertically movable carton-stripping ram 87 is disposed, this ram being connected to bell crank mechanism 88 and links 89 and 90 to bell crank 74, so that the ram operates in timed relation with rack bars 31 and movable table 69. The ram is inclined upwardly and rearwardly at an angle such that the travel of its upper end in a direction longitudinal to the machine closely approximates the longitudinal travel of conveyor 83. Pivoted to the upper end of ram 87 at 91 is a stripper tray 92, comprising a U shaped frame 93, the bight portion of which is directed transversely of the forward end of conveyor 83 and the arms of which extend longitudinally and rearwardly over the forward end of the conveyor. The bight portion of the tray is provided with arms 94 and 95 directed longitudinally of conveyor 83 and disposed to lie between adjacent rows of bottles B in a carton resting upon the tray. At least one arm of the tray 92 is provided with a stop 96, against which one of the extended side flaps of the carton C will engage to limit longitudinal movement of the carton over the tray and the bight portion of frame 93, and at least one of the arms 94 and 95 is positioned to engage beneath the flaps 48 and 49 and support the same in their proper horizontal position.

Figure 12:
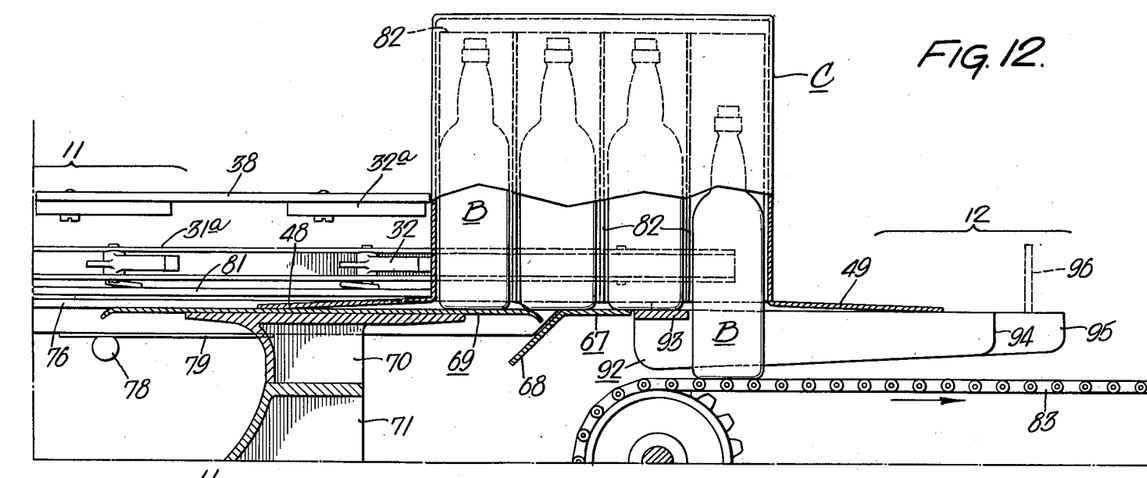
Figure 13:
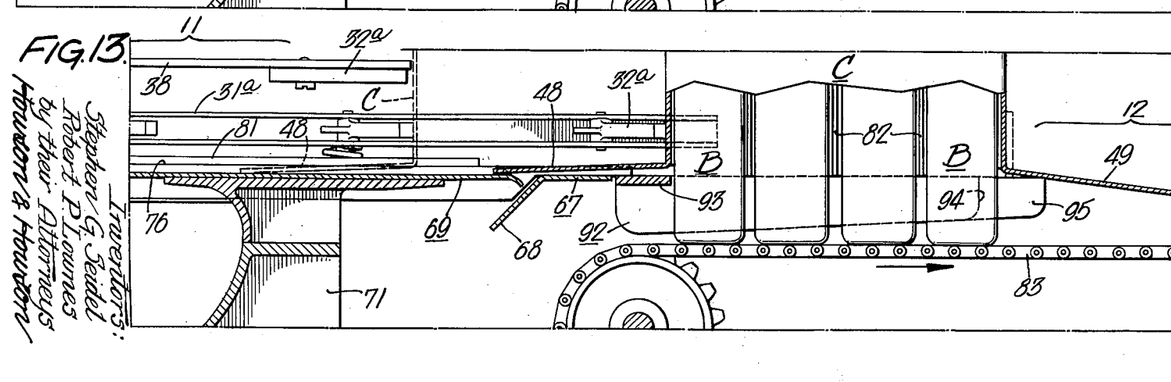
Figure 14:
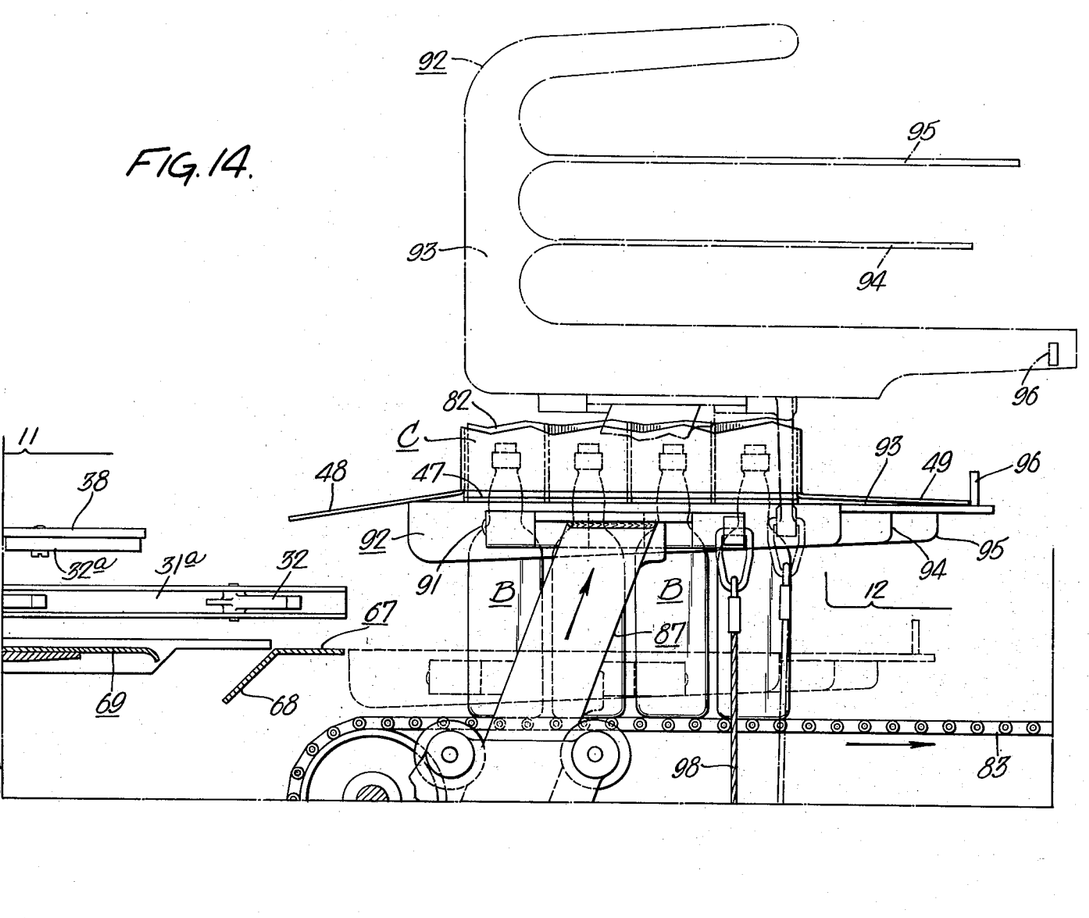
Figures 15, 17:
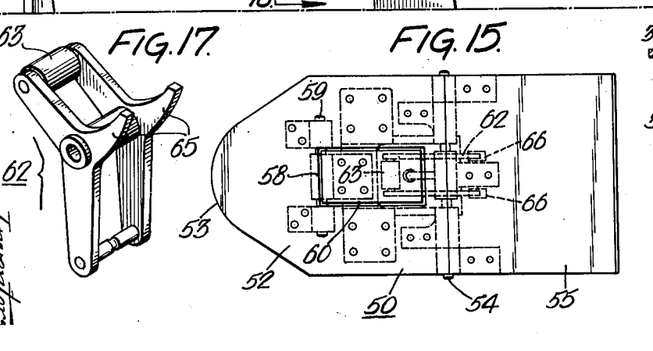
Figure 15 is a sectional view on line 15—15 of Figure 6.
Figure 17 is a perspective view of the leaf control element for the movable leaf of the fixed table.
Figure 16:
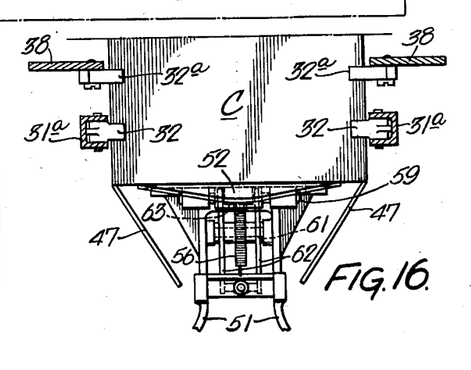
Figure 16 is a sectional view on line 16—16 of Figure 6.
Figure 18:
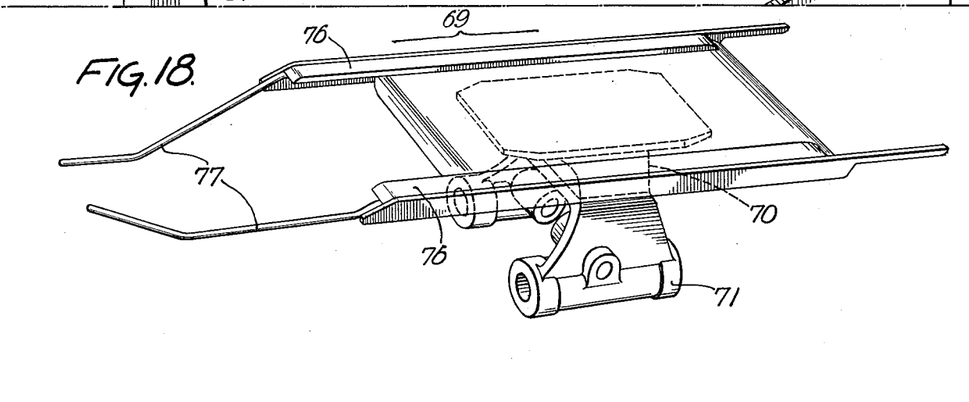
Figure 18 is a perspective view of the movable table.

From its dotted line position of Figure 11, the carton is shifted by the next actuation of rack bars 31a, to the position shown in Figure 12, in which the carton is supported in part by the table 69, in part by support 67, and in part by tray 92. The succeeding actuation by bars 31a shifts the carton so that it is supported entirely by tray 92, the contents of the carton resting upon conveyor 83 as shown in Figure 13. As the rack bars 31 are withdrawn from this feeding stroke, the ram 87 is actuated, raising the carton C and divider 82 but leaving the bottles seated upon the conveyor 83. Connected to tray 92 is an arm 97, which in the normal horizontal position of the tray and lowered position of the ram, is horizontally disposed. Arm 97 is connected through a slack flexible element 98 with a fixed support 99, and when carton C has been elevated by tray 92 to an extent sufficient to clear the bottles B, the slack in flexible element 98 has been taken up, and arm 97 and accordingly, tray 92, are caused to rotate about pivot 91 from a normal horizontal to a substantially vertical position. The supported carton, falling by gravity from the tray, tips over bar 100 carried by the upper end of ram 87 and is deposited closed end down upon a conveyor 101 by means of which it may be transported to a convenient point for reception of the filled and labeled bottles B. Attention is directed to the fact that the use of the multiple conveyor bottling-sorting mechanism shown more clearly in Figure 1a, enables these bottles to be distributed upon the discharge conveyor 85 without the jamming or breakage common to such mechanisms.

Figure 1:
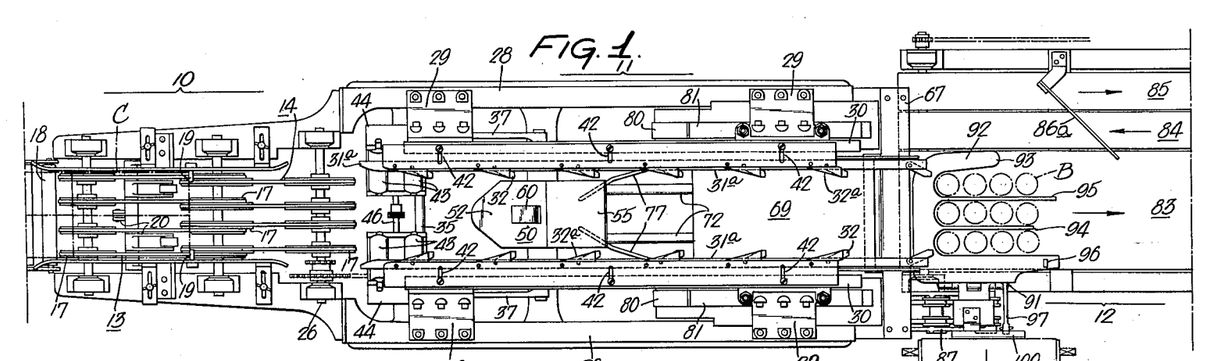
Figures 1 and 1a are views showing the plan view of the mechanism.
Figure 1A:
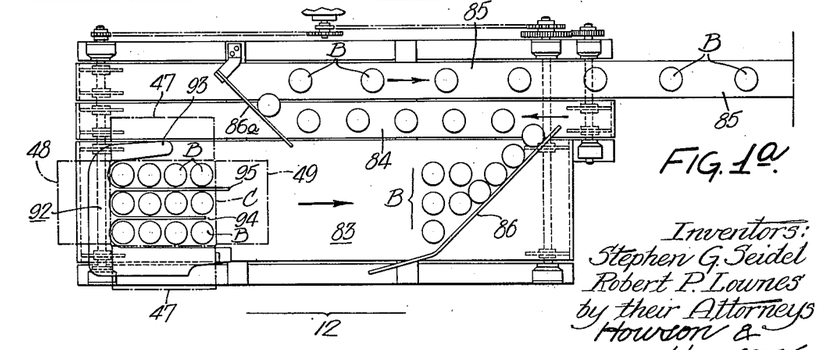
Figure 2:
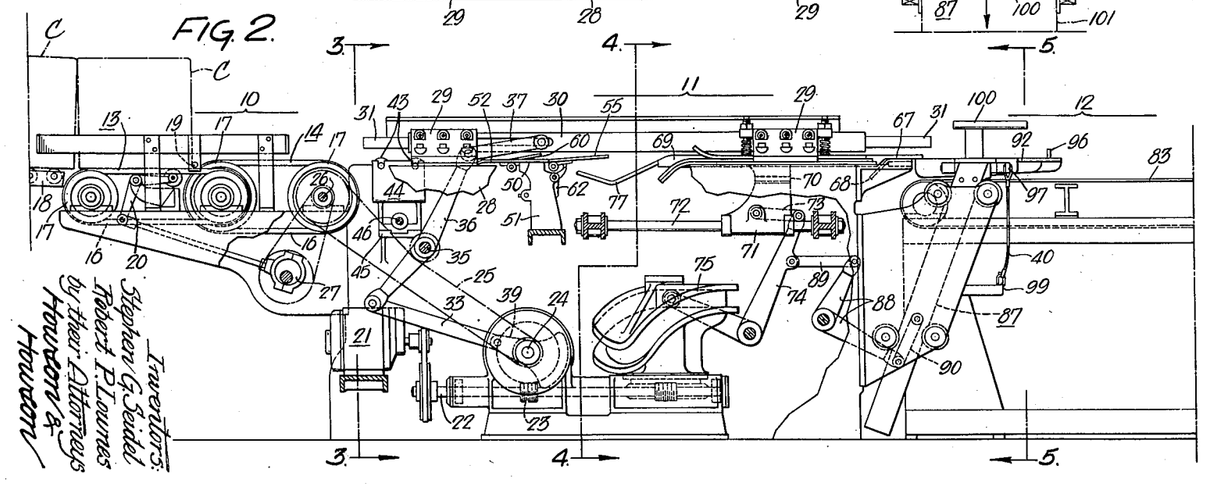
Figure 2 is a side elevation, whereof
Figure 3:
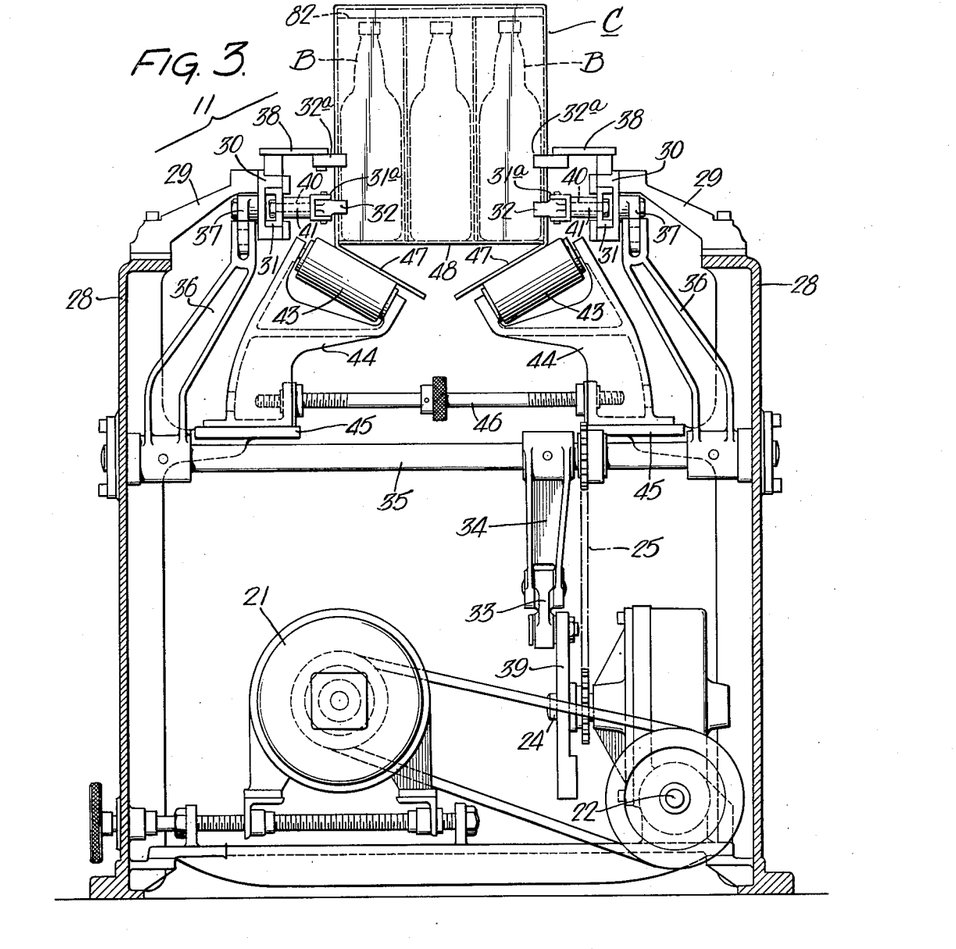
Figures 3, 4 and 5 are enlarged transverse sectional views on lines 3—3, 4—4 and 5—5 respectively of Figure 2.
Figure 4:
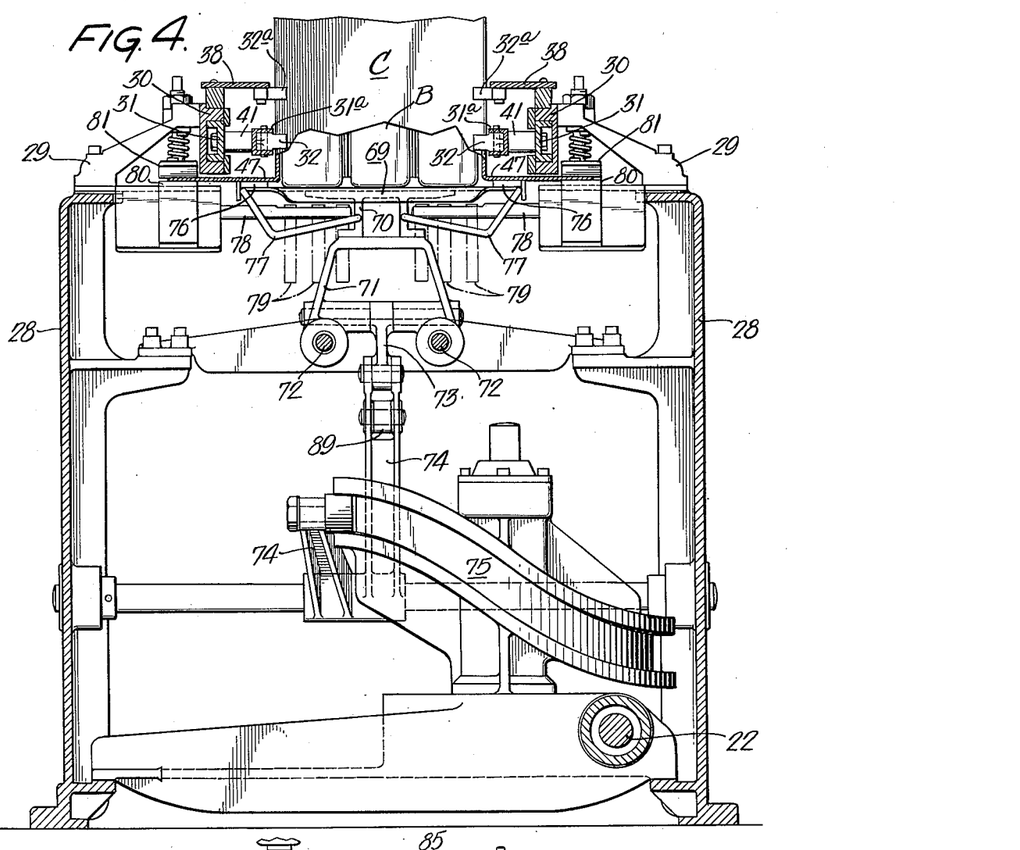
Figure 5:
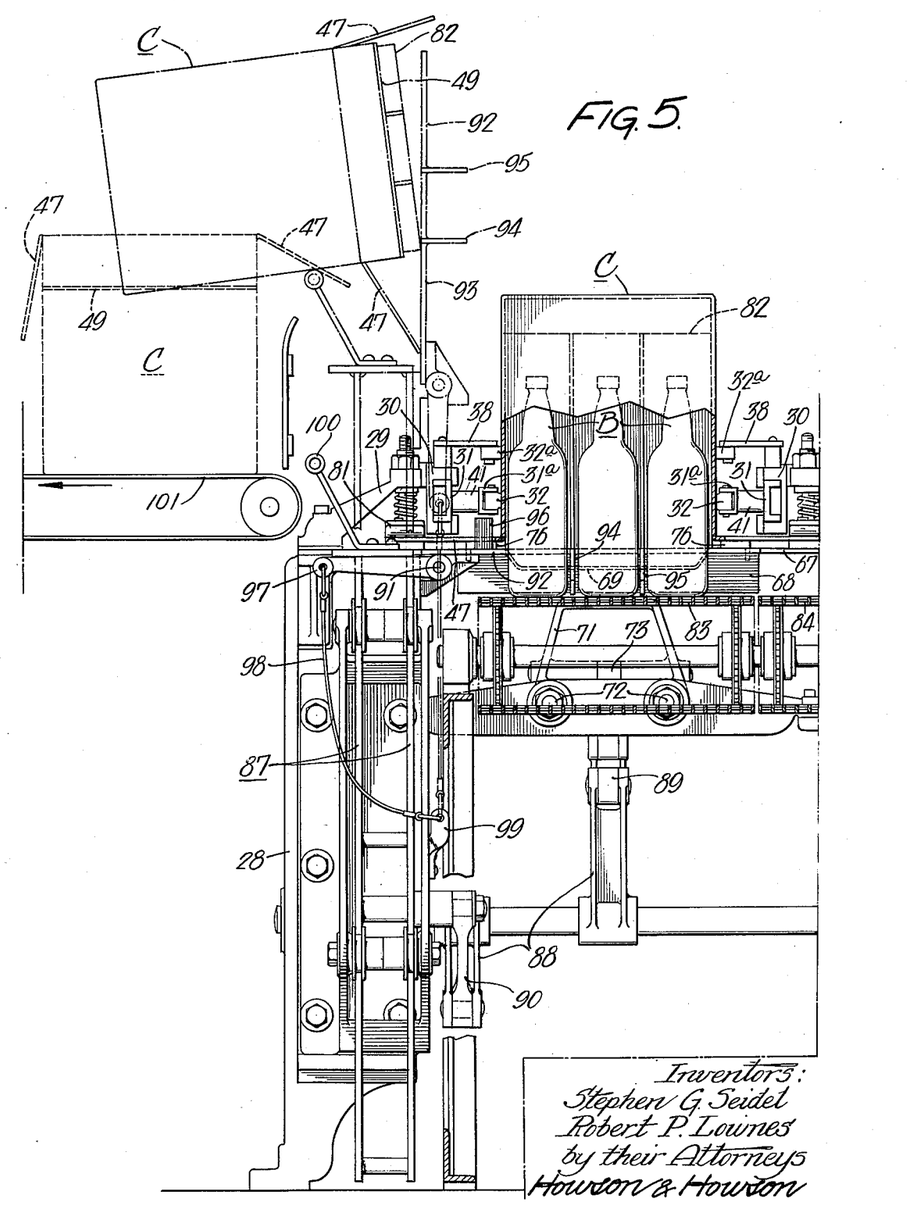

The mode of operation of the machine is in general as follows:

The carton C with the contained bottles enter the left hand end of the machine as viewed in Fig. 1, the closure flaps of the carton being at the under side and in the normally closed positions. The carton is so arranged that the outer flaps 47 lie at opposite sides respectively of the path of travel of the carton through the machine. In this position the cartons are fed in suitably spaced relation into the flap-opening section 11, the rate of feed being synchronized with the operation of section 11 as described above. In the flap opening section 11, the outer flaps 47 are permitted to drop downwardly at opposite sides of the carton to assume a partially opened position in which they still function to hold the inner flaps 48 and 49 in closed bottle-supporting positions. In this condition the carton advances onto the relatively fixed table 50, the top of which passes between the partially opened outer flaps and under the still closed inner flaps so as to support the latter and the contents of the carton independently of the outer flaps. The outer flaps are then permitted to drop downwardly to a fully opened position at opposite sides respectively of the table.

As the reciprocating bars 31 and the pawls 32 continue to advance the carton in its path of travel, the carton being supported solely on the table 50, the tripping leaf 55 of the table top permits the inner flap 48 at the trailing end of the carton to move downwardly as best shown in Fig. 8. At this point the forward end of the carton will have been engaged by the rear end of the reciprocating table 69 so that that table assumes the function of the flap 48 to support the bottles at the trailing end of the carton. Further advance movement of the carton with respect to the table 69 will turn back the flap 48 to an extended substantially horizontal position resting upon the top of table 69. Before the movement has progressed to this extent, however, the elements 77 of the table 69 will have turned the depending outer flaps upwardly and outwardly to a horizontal position in which the portions of those flaps which adjoin the hinges will be confined between the side rails 76 of the table 69 and the spring pressed member 81. The carton will now be supported solely upon the rails 76 of the table 69.

When the carton has advanced on the table 69 to the point where the forward edge of the table top lies rearwardly of the forward inner flap 49, that flap will be permitted to drop onto the supports 78 and the flexible fingers 79 (see Figs. 10 and 11). At this point the table 69 advances with respect to the carton so that the forward edge of the table will pass under the bottles in the forward part of the carton and will simultaneously force the flap 49 downwardly and forwardly to a substantially horizontal position so that it may pass over the support 67 and onto the tray 92. The advance movement of the carton onto this tray permits the bottles to move downwardly between the arms of the tray onto the conveyor 83, and after all of the bottles have thus moved downwardly onto the conveyor the tray is elevated to remove and displace the carton onto the conveyor 101 which thus removes the empty carton, now in upright position, from the machine. The bottles disposed on the conveyor 83 are carried to the deflector 86 and then transferred in more or less uniformly spaced single row relation to the belt 85 by means of the device illustrated in Fig. 1a.

It will be obvious from the foregoing that a machine of this character is extremely compact and will occupy but little space as compared with machines of the same character as heretofore constructed. Furthermore, since the cartons are at all times moving in a straight path and side conveyors are eliminated to the greatest possible extent, servicing of the machine and the number of attendants necessary may be materially reduced. Since the construction illustrated is obviously capable of considerable modification, it will be understood that the invention is not limited to the specific detail thereof except as hereinafter claimed.

We claim.

1. In apparatus for opening and emptying cartons having outer and inner closure flaps, the combination with means for advancing the cartons in inverted positions over a predetermined path, of a series of supports in said path successively receiving the carton as it is advanced along said path, said supports including a first support having means to effect a preliminary partial opening of the outer closure flaps, a second support receiving the carton from the first named support and supporting the contents of the carton through the inner closure flaps, and a third support having means to engage and complete the opening of the outer closure flaps together with means to engage and open said inner flaps while directly supporting the contents of the carton.

2. In apparatus for opening and emptying cartons having outer and inner closure flaps, the combination with means for advancing the cartons in inverted positions over a predetermined path, of a series of supports in said path successively receiving the carton as it is advanced along said path, said supports including a first support having means to effect a preliminary partial opening of the outer closure flaps, a second support receiving the carton from the first named support and supporting the contents of the carton through the inner closure flaps, a third support having means to engage and complete the opening of the outer closure flaps, and means to engage and open said inner flaps while directly supporting the contents of the carton, a tray receiving the now opened carton and supporting the same while permitting gravity discharge of the contents thereof, and means for reciprocating said tray in a direction perpendicular to said path.

3. In a machine for opening and emptying loaded cartons having outer and inner pairs of closure flaps, the flaps of said pairs being hinged at their outer edges to the walls of the carton and meeting upon lines medial to the carton, the meeting lines being perpendicularly related, means to effect a preliminary opening of the outer flaps comprising opposed supports adapted to receive and support the edges of the carton to which the outer flaps are hinged, said supports inclining inwardly and downwardly, whereby the contents of the carton may exert pressure on said outer flaps causing the same to partially open to a position where they inclined downwardly and inwardly at substantially the angle of the supports and are supported thereby, said supports limiting the opening of the outer flaps to an angle such that the inner flaps are maintained closed an support the contents of the carton, a table receiving the carton from said supports and supporting the carton and its contents through engagement with the closed inner flaps thereof, means operative during support of the carton by said table for completing opening of the outer flaps, means on said table for releasing the inner flap at the trailing end of the carton to effect a partial opening of said flap, a reciprocatory support arranged to receive the carton from the table and movable initially into position between the said partially open inner flap and the contents of the carton, and means for reciprocating the support beneath and with respect to the carton to first turn back the said partially open inner flap to fully open position and to simultaneously release the other of the inner flaps, and to then turn back the latter flap to fully open position while still supporting the contents of the carton.

4. In apparatus for opening and emptying cartons of the character described, the combination with means for advancing the cartons in inverted positions over a predetermined path, of means in said path for opening the outer closure flaps while preventing discharge of the contents of the carton, means reciprocating longitudinally of said path for thereafter sequentially opening the inner closure flaps, said means directly engaging the contents of the carton to support the same, and a tray reciprocating perpendicularly to said path receiving and supporting the opened carton while permitting passage of the contents thereof.

5. In means for opening and emptying cartons having perpendicularly related pairs of closure flaps hinged to the side walls thereof, the combination with means for advancing the carton over a predetermined path longitudinal to the hinges of said outer closure flaps, of means in said path for successively effecting a preliminary and then a complete opening of the outer closure flaps, said means including a table receiving the carton and its contents and supporting the same through the inner closure flaps thereof during completion of opening of the outer closure flaps, a second table receiving the carton from the first named table, and means operative during transfer for effecting a preliminary opening of one of the inner closure flaps, said second table including means for completing opening of said inner flap and for supporting the contents of the carton exposed by opening thereof.

6. In means for opening and emptying cartons having perpendicularly related pairs of closure flaps hinged to the side walls thereof, the combination with means for advancing the carton over a predetermined path longitudinal to the hinges of said outer closure flaps, of means in said path for successively effecting a preliminary and then a complete opening of the outer closure flaps including a table receiving and supporting the carton and its contents through the inner closure flaps thereof during completion of opening of the outer closure flaps, said table including a rearwardly disposed movable leaf movement of which effects a preliminary opening of one of said inner flaps, and a carton controlled latch determining the instant of movement of said leaf.

7. In apparatus for opening and emptying cartons having internally arranged separators for the contents thereof and having outer and inner closure flaps the combination with means for advancing the cartons in inverted positions over a predetermined path, of means in said path for successively opening the outer and inner closure flaps of the carton while supporting the contents of the carton to prevent the displacement thereof from the carton, and a tray reciprocating perpendicularly to said path receiving and supporting the opened carton and its separator while permitting passage of the contents thereof.

8. In apparatus for opening and emptying cartons having outer closure flaps hinged respectively to two opposite sides of the carton and inner closure flaps hinged respectively to the two other sides, the combination with means for traversing the cartons over a predetermined linear path of means for supporting the cartons in said traverse movement, said support means including elements initially underlying said flaps and preventing downward displacement thereof by weight of the contents of the carton, and including also a longitudinal section wherein the outer flaps are permitted to move downwardly toward the opposite sides respectively of the path of traverse to a partially open position, a relatively fixed section adjoining said longitudinal section and arranged in the path of traverse to assume a position between the partially open outer flaps and immediately below the inner flaps so as to support the latter independently of the outer flaps, means on said relatively fixed section automatically operative as the carton traverses said section to release the inner flap at the trailing end of the carton for movement downwardly to a partially open position, and a relatively movable section following the said relatively fixed section in said path and movable to a position between the said partially open inner flap and the contents of the carton so as to support said contents independently of the flap.

9. In apparatus for opening and emptying cartons having outer closure flaps hinged respectively to two opposite sides of the carton and inner closure flaps hinged respectively to the two other sides, the combination with means for traversing the cartons over a predetermined linear path, of a relatively fixed table afford a support for the carton over a portion of said path and on which the carton is supported in inverted position with the outer flaps depending at opposite sides respectively of said path, a reciprocatory table adjoining the said fixed table and arranged to receive the carton from the latter, means on the relatively fixed table for partially releasing the inner flap at the trailing end of the carton so as to permit passage of the reciprocatory table between the said flap and the contents of the carton whereby advance movement of the carton with respect to the latter table will effect a full opening of the flap while the said contents are supported on the table, and means for reciprocating the table with respect to the carton so as to release and to subsequently open the inner flap at the leading end of the carton simultaneously with the movement of the table under the carton contents so as to support the latter.

10. Apparatus according to claim 9 wherein the reciprocatory table carries means for engaging and elevating outwardly to substantial horizontal position the dependent outer flaps of the cartons.

STEPHEN G. SEIDEL.
ROBERT P. LOWNES.

REFERENCES CITED

The following references are of record in the file of this patent:

UNITED STATES PATENTS

| Number | Name | Date |
|---|---|---|
| 1,227,764 | Dupuy | May 29, 1917 |
| 1,454,051 | Heulings | May 8, 1923 |
| 2,315,880 | Stiles | Apr. 6, 1943 |
| 2,323,852 | Seidel et al. | July 6, 1943 |
| 2,353,736 | Le Frank | July 18, 1944 |
| 2,389,696 | Stiles | Nov. 27, 1945 |